Patented Oct. 29, 1935

2,018,759

UNITED STATES PATENT OFFICE 2,018,759

ACETYLATION OF LIQUID POLYHYDROXY ALIPHATIC ALCOHOLS BY MEANS OF A KETENE

Per K. Frolich and Peter J. Wiezevich, Elizabeth, N. J., assignors to Standard Oil Development Company, a corporation of Delaware No Drawing. Application March 5, 1932, Serial No. 597,086

6 Claims. (Cl. 260—106)

This invention relates to the use of ketenes in acetylating difficultly esterifiable compounds.

The use of acetic acid as an acetylating agent is known and is limited to certain types of liquid organic compounds. Lower alcohols react very easily with acetic acid giving esters like ethyl acetate, butyl acetate, etc. A large number of liquid hydroxy compounds, for example, the aliphatic alcohols of high molecular weight, cresols, etc., react with acetic acid only to a small extent if at all. By hydroxy compound is meant a compound containing an OH group, existing in alcohols, glycols, chlorhydrins, phenols, etc. and by "difficultly esterifiable" is meant difficultly esterifiable with acetic acid. Acetylation of such compounds may be effected by refluxing for a long time with acetic anhydride, but the method is not efficient due to the inherent formation of acetic acid during the reaction. This invention utilizes acetic ketene ($H_2C=CO$), referred to herein as ketene (but without excluding its homologs where applicable) for effecting the following typical reactions in a manner to be described.

Primary alcohols react very readily with ketene, secondary alcohols react more slowly, and tertiary ones react only with difficulty. These various types of alcohols may be separated as follows: A mixture of primary, secondary and tertiary alcohols is treated with sufficient ketene to react with the primary group and is then distilled, taking overhead in the distillate the secondary and tertiary alcohols, leaving the primary alcohol ester as bottoms in the still. The overhead mixture is then treated for a longer period with sufficient ketene to react with secondary alcohol and the distillation is repeated, the tertiary alcohols being distilled over, and the secondary alcohol esters remaining in the still as bottoms. The tertiary alcohols may then be esterified wtih ketene to the tertiary acetates, if so desired.

Vegetable oils such as castor oil, linseed oil, etc., containing hydroxy groups, are contacted with ketene at ordinary temperatures with or without the presence of an inert solvent with the resulting production of acetylated products. These acetylated oils may be used as plasticizers.

Cresols yield acetylated cresols by treating the former with ketene with or without the aid of inert solvents. For instance, in an experiment, ketene was bubbled through ortho cresol for 133 minutes at 8.6 cc. per minute. The product was washed five or six times with dilute sodium hydroxide (1/2 N) and then with water. The solution distilled over almost entirely between 206° and 210° C. (B. P. of acetyl ortho cresol being 208° C.). In this evperiment 38 g. of ketene yielded 60 gms. of acetyl ortho cresol. This product may be oxidized directly to acetyl salicylic acid.

Glycols or glycerols may be quantitatively converted to their acetylated derivatives by bubbling ketene through them or through a solution of such compounds in an inert solvent. For example, 75 gms. of glycerine were dissolved in a solution of 100 gm. of acetone and 20 gms. of absolute alcohol, and ketene was bubbled through the mixture for 10 hours. Heat was evolved and the temperature of the solution rose to about 35° C. An alkaline scrubber employed at the end of 8 hours showed that the absorption was only 25% of the ketene introduced. The reaction continued to evolve heat noticeably for another four hours. Then the mixture was distilled under vacuum, the first 25 cc. being discarded. About 50% of the remainder came over at 90–125° C. and the rest at 125–135° C. (at 5 mm. pressure). Titration of the hydrolyzed product showed that the second portion was mainly triacetin (90% theoretically), B. P. 258–260° C. at atmospheric pressure, and the first fraction was a mixture of mono- and di-acetin.

Other alcohols such as tertiary amyl alcohol, acetol, nonyl alcohol, furfuryl alcohol, cinnamyl alcohol, diacetone alcohol, phenyl ethyl alcohol, aldol, cyclohexanol, guaiacol, ethylene chlorhydrin, etc., which are difficult to esterify in the usual manner, yield valuable acetylated products when treated with ketene under similar conditions.

In these reactions, it is preferable to employ low temperatures (say below 100° C.), that is, room temperatures or slightly elevated temperatures, generally below the boiling points of the materials treated. Catalysts such as mineral acids, bisulphates, unstable metallic acetates, or the like may be employed to speed up the reactions. The use of inert solvents such as ethers, ketones, chlorinated hydrocarbons and others in which both the ketene and the material to be acetylated are soluble have been found to be advantageous.

It will be understood that the homologs of acetic ketene, such as propyl and butyl ketene, react similarly in general, and may be employed according to this invention. Liquid phase reaction is usually desirable for convenience of operation, but particular circumstances may indicate the use of the solid or gaseous phases, with or without pressure and temperature above or below atmospheric.

The foregoing description is merely illustrative and various changes and alternative arrangements may be made within the scope of the appended claims, in which it is our intention to claim all novelty inherent in the invention as broadly as the prior art permits.

We claim:

1. A method of esterifying liquid polyhydroxy aliphatic alcohols, which comprises reacting them with a ketene of the class consisting of acetic ketene and its homologs at a temperature substantially below 100° C.

2. A method according to claim 1, where an inert solvent is employed in which both the ketene and the liquid hydroxy compound are soluble.

3. A method of acetylating liquid polyhydroxy aliphatic alcohols, which consists in reacting liquid polyhydroxy aliphatic alcohols with ketene at a temperature substantially below 100° C.

4. A method of preparing acetylated glycols, which consists in reacting a liquid glycol with ketene at a temperature substantially below 100° C.

5. A method of esterifying glycerine which consists in reacting glycerine with a ketene at a temperature substantially below 100° C.

6. Process according to claim 5, carried out in the presence of a solvent consisting essentially of absolute alcohol and acetone.

PER K. FROLICH.
PETER J. WIEZEVICH.